(12) United States Patent
Matthews et al.

(10) Patent No.: US 6,582,751 B1
(45) Date of Patent: Jun. 24, 2003

(54) MEAT PRODUCT INCLUDING A FERMENTED MILK PRODUCT

(75) Inventors: Bernard Trevor Matthews, Norfolk (GB); David John Joll, Norfolk (GB); Werner Koppers, Rastede (DE); Friedrich Buse, Oldenburg (DE)

(73) Assignee: Bernard Matthews PLC, Norwich (GB)

( * ) Notice: Subject to any disclaimer, the term of this patent is extended or adjusted under 35 U.S.C. 154(b) by 0 days.

(21) Appl. No.: 09/561,848

(22) Filed: Apr. 28, 2000

Related U.S. Application Data

(63) Continuation-in-part of application No. PCT/GB99/01854, filed on Jun. 11, 1999.

(30) Foreign Application Priority Data

Jun. 18, 1998 (DE) .......................................... 198 26 978
Aug. 13, 1999 (DE) .......................................... 199 38 434

(51) Int. Cl.$^7$ ........................... A23L 1/314; A23L 1/318
(52) U.S. Cl. ........................................ 426/641; 426/281
(58) Field of Search ................................ 426/641, 652, 426/281

(56) References Cited

U.S. PATENT DOCUMENTS

| | | | | |
|---|---|---|---|---|
| 4,362,750 A | * | 12/1982 | Swartz | 426/652 |
| 4,492,712 A | | 1/1985 | Casella | 426/59 |
| 5,004,618 A | * | 4/1991 | Buckholz et al. | 426/641 X |
| 5,039,543 A | | 8/1991 | Lee et al. | 426/533 |
| 5,106,643 A | | 4/1992 | Laufer | 426/565 |
| 5,538,743 A | | 7/1996 | Heinemann et al. | 426/42 |
| 5,840,884 A | * | 11/1998 | Lis et al. | 426/658 X |

FOREIGN PATENT DOCUMENTS

| | | |
|---|---|---|
| DE | 2152 655 | 4/1973 |
| DE | 2 203 582 | 8/1973 |
| DE | 195 19 851 | 12/1996 |
| DE | 197 52 249 A1 | 4/1999 |
| EP | 0024790 A1 | 3/1981 |
| EP | 0 029 503 A1 | 6/1981 |
| EP | 0 478 526 A1 | 4/1992 |
| EP | 0649598 A1 | 4/1995 |
| EP | 0850566 A1 | 7/1998 |
| EP | 983 724 | 3/2000 |
| JP | Sho 63-014656 | 1/1988 |
| JP | 63014656 | 1/1988 |
| JP | 03-262462 | 11/1991 |
| JP | 07-107941 | 4/1995 |
| JP | 95095915 | 10/1995 |
| RU | 2084184 | 5/1995 |
| RU | 2084184 C1 | 7/1997 |
| SU | 1090-316 A | 10/1982 |
| SU | 875660 | 8/1983 |
| WO | 99/21438 | 5/1999 |

OTHER PUBLICATIONS

1984 Technology of Preparing Boiling Sausage, Institute for Technology —Federal Institute for Meat Research (with translation).
1972 Protein–Enriched Milk and Milk Products–Dr. H. Graf Zu Solms–Baruth (with translation).
1) EP 1 024 710 (Notice of Opposition), Mar. 20, 2002 (with English translation).
2) Lebensmittel Report, Sep. 1998 (with English translation).
3) Lebensmittel Praxis Nr. 002 vom Mar. 27, 1998, Seite 060 (Datenbankausdruck) (with English translation).
4) Lebensmittel Praxis Nr. 011 vom Jun. 5, 1998, Seite 040 (Datenbankausdruck) (with English translation).
5) Buch: "Technologie der Brühwurst", Bundesanstalt fur Fleischforschung, Kulmbacher Reihe Band 4, 1984, Seiten 60 bis 73 (with English translation).

* cited by examiner

Primary Examiner—Arthur L. Corbin
(74) Attorney, Agent, or Firm—RatnerPrestia

(57) ABSTRACT

A meat product is provided that comprises a monolithic piece of meat, wherein said piece has been injected with a liquid fermented milk product and then processed mechanically to distribute said fermented milk product substantially uniformly throughout the piece. Also provided is a process for making such a meat product comprising injecting a monolithic piece of meat with a liquid fermented milk product, and thereafter mechanically processing the meat to distribute the fermented milk product substantially uniformly through the meat. Said fermented milk product may comprise one or more products selected from yogurt, buttermilk, soured cream milk, soured milk, fermented whey and kefir. The meat product may be raw, and the fermented milk product may have a pH less than about 5.2, preferably less than about 4.8. Alternatively, the meat product may be cooked, and the fermented milk product may have a pH of not less than 5.0, and preferably at least 5.5 such that the pH of the product as a whole is above the isoelectric point of the meat.

32 Claims, 3 Drawing Sheets

MEAT PRODUCT INCLUDING A FERMENTED MILK PRODUCT

This application is a continuation-in-part application of PCT/GB99/01854 filed on Jun. 11, 1999.

FIELD OF THE INVENTION

The present invention relates to a novel meat product comprising a fermented milk product. In particular, the present invention relates to a meat product comprising a monolithic piece of meat that is injected with a fermented milk product. The present invention also relates to a process for producing a meat product injected with a fermented milk product.

BACKGROUND TO THE INVENTION

Yogurt and other fermented milk products are used in many traditional recipes for marinating and/or pickling meat. For example, it is well known to marinade venison in sour buttermilk.

Russian patent specification Ser. No. 2084184 discloses a fermented meat product obtained by pickling the meat product in the presence of a fermented milk product.

According to these recipes, the fermented milk product is used to impart a sharp, tangy flavor to a marinade, outer zone of the meat product.

WO-A-99/21438 discloses a cooked sausage comprising a mixture of meat emulsion and mild yogurt, wherein the yogurt is substantially homogeneously dispersed through the meat emulsion, and the mixture has a pH of about 5.5 or more. The water retaining capacity of the meat is thus retained, providing a sausage having desirable organoleptic qualities. Said mild yogurt may be prepared from milk mixtures by inoculation by slow working yogurt starter cultures. An advantage of the sausage product of WO-A-99/21438 is that it contains.fewer calories per unit weight than conventional meat sausages and is generally easier to digest.

OBJECTS OF THE INVENTION

An object of the present invention is to provide a novel meat product.

In particular, it is n object of the present invention to provide a novel meat product comprising a monolithic piece of meat, that is a piece of meat that retains its natural structure and consistency. The term "monolithic" thus embraces whole muscle pieces of meat, as well as smaller, but nevertheless recognizable pieces such as natural 'butcher' cuts, slices and strips of meat and cubed or diced meat, and also reformed meat such, for example, as reformed steaks. The term "monolithic" is intended to exclude meat pieces which have been subjected to more severe mechanical processing such as minced or comminuted meat and meat emulsions or doughs of the kind that are formed into sausages, for example.

A further object of the present invention is to provide a novel meat product comprising a fermented milk product, which may (but not necessarily) be lighter in terms of its calorie-content per unit weight as compared with unprocessed meat and is easier to digest.

Yet another object of the present invention is to provide a raw meat product which has a longer shelf life as compared with natural cuts of raw meat. Yet another object of the present invention is to provide a meat product having a novel aroma and/or taste.

Yet another object of the present invention is provide an industrial process for producing such a meat product.

SUMMARY OF THE INVENTION

According to one aspect of the present invention therefore, there is provided a meat product comprising a monolithic piece of meat, wherein said piece has been injected with a liquid fermented milk product and then processed mechanically to distribute said fermented milk product substantially uniformly throughout the piece.

According to another aspect of tile present invention, there is provided a process for making a meat product, comprising injecting a monolithic piece of meat with a liquid fermented milk product, and thereafter mechanically processing the meat to distribute the fermented milk product substantially uniformly through the meat.

Said fermented milk product may comprise one or more products selected from yogurt, buttermilk, soured cream milk, soured milk, fermented whey and kefur.

The term "soured cream milk" as used herein includes soured cream, sauerrahm, schmand and creme fraiche.

The term "soured milk" includes sauermilch and dichmilch.

The injected fermented milk product may be distributed further throughout the piece of meat by mechanically tenderising and/or tumbling. Said product may comprise 5–50% by weight of injected fermented milk product. It has been found that by injecting liquid fermented milk product into a monolithic piece of meat in accordance with the invention, pores and cavities within the piece may be filled with the fermented milk product and, where higher proportions of yogurt are used, the piece may become saturated with fermented milk product. The invention thus provides a meat product having attractive, novel organoleptic properties. By the addition of fermented milk product the calorie-content per unit weight of the product is reduced as compared with natural meat, and the product as a whole may be generally easier to digest. As a further advantage, the mechanical processing of the meat after injection assists in disrupting the structure of the meat, especially proteins, which may thus be opened, and free water within the meat may become incorporated properly within the meat structure. As a result, meat processed in accordance with the invention will typically be tender and juicy after cooking.

The product of the present invention may be cooked as part of the production process, or alternatively the product may be supplied raw for cooking by a consumer.

Where the product is to be supplied raw, e.g. for cooking at home by a consumer, the fermented milk product may have a pH less than 5.2, preferably less than 4.8, and more preferably less than 4.0. In some embodiments, the fermented milk product may have a pH in the range of 3.6 to 4.0, for example 3.7, 3.8 or 3.9. By using a fermented milk product having such a low pH, the acidity of the product as a whole is increased which tends to suppress the proliferation of unwanted microorganisms within the meat before cooking. Thus, the product of the present invention may have a longer shelf as compared with natural raw meat.

On the other hand, where the product is to be cooked as part of the production process, e.g. for sale as a cooked cold cut, it is preferable to use a fermented milk product for injection that has a pH which is selected such that, when mixed with the meat, the pH of the product does not fall too close to the isoelectric point of the meat. To this end, the overall pH of the product should be not less than 5.0, and is preferably at least 5 5. The pH of the fermented milk product which should be used to ensure that the pH of the product falls within these ranges will obviously vary depending on how much fermented milk product is incorporated into the product. However, the fermented milk product will typically have a pH of 4.8 or more, typically 4.8–5–1. By maintaining the pH of the product as a whole above the isoelectric point of the meat, the loss of moisture and water from the product during cooking is minimised. On the other hand, if the pH of the product falls below about pH 5.5 towards the isoelectric point of the meat, then the water-retaining capacity of the meat is reduced, with the result that the juiciness and texture of the final product is impaired.

Preferably, the fermented milk product comprises yogurt.

For a product according to the invention that is cooked as part of the manufacturing process, said product may be injected with a mild yogurt that is prepared in the traditional manner, but is used in the process of the invention before fermentation is fully completed. Thus, after inoculation of a milk mixture with a suitable starter culture, the pH may be monitored until it reaches a desired value. The mild yogurt produced as a result is then made ready for use in the method of the present invention.

Prior to injection, the yogurt may be treated to destroy the yogurt cultures and any other bacteria present in the yogurt. In some embodiments, fermentation of the yogurt may be quenched by cooling the yogurt to a temperature in the range –2 to 6° C., preferably about –1° C. The yogurt may be cooled rapidly with liquid nitrogen or using a plate-heat exchanger. Alternatively, the yogurt may be heated to a temperature in the range 65 to 70° C., for instance by using a heat exchanger instead of cooled.

In order lo assist in controlling accurately the pH of the yogurt to be injected into the meat piece, slow-working yogurt starter cultures are preferably used. Such slow-working yogurt cultures may comprise *L.acidophilus*, *Bifidobacteria*, and *S.thermophilus*. Further, the yogurt is preferably stirred continuously before use to allow accurate pH control.

In accordance with the invention, buttermilk may be made from the residual milk that remains after conventional butter-churning, that is separation of the milk-fat (butter) from the remaining milk substances. Said residual milk may be soured using suitable starter cultures such, for example, as *Lactococcus lactis* subsp. *cremoris*, *Lactococcus lactis* subsp, *lactis*, *Leuconostoc mesenteroides* subsp. *cremoris* and/or *Lactococcus lactis* subsp. *diacetylactis* until is reached. Alternatively said buttermilk may be made by first souring whole milk to the desired pH with suitable starter cultures, and then quenching fermentation and churning to separate the buttermilk from the milk-fat (butter).

Said soured creamed milk in accordanc with the invention may be made by souring whole milk with a high fat content using suitable starter cultures, for example *Lactococcus lactis* subsp. *cremoris*, *Lactococcus lactis* subsp. *lactis* and/or *Leuconostoc mesenteroides* subsp. *cremoris* to a desired pH of 4.8 or more.

Soured milk, including curd milk, may be made by fermenting whole milk having a normal fat content.

Whey is a by-product of cheese manufacture in which whole milk is fermented using suitable cheese starter cultures, such as *Lactococcu lactis* subsp. *cremoris*, *Lactococcus lactis* subsp. *lactis* and/or *Leuconostoc mesenteroides* subsp. *cremoris* in the presence of a curdling enzyme such, for example, as rennet. Once the desired pH is reached, the fermentation may be quenched and the cheese allowed to set. Once the mass has set, the cheese may be crushed mechanically, and the liquid whey extracted from the remaining solid cheese component.

In some embodiments, tile fermented milk product of the present invention may comprise two or more different components, in which case it is only necessary that the overall pH of the fermented milk product is within the desired range.

In some embodiments, the fermented milk product may comprise an edible, alkaline additive to neutralise the acidity of the fermented milk product. Said alkaline additive may comprise, for example carbonated soda and/or ammonium carbonate. Phosphates and/or citrates could also be used to stabilise the mixture.

In a further aspect of the present invention, the fermented milk product injected into the meat piece may comprise live cultures, so that the cultures in the product act as protective cultures which hinder the reproduction of undesirable micro-organisms in the meat. Said live cultures may be found in fermented milk products having a low pH for injection into neat intended to be supplied raw, as well as in fermented milk products having a relatively high pH for injection into meat intended to be cooked as part of the manufacturing process.

Prior to injection, the fermented milk product may be combined with additional condiments aid/or flavorings. Said fermented milk product may comprise 5 to 25% by weight (based on the fermented milk product) of such additional flavorings and condiments. For example, the fermented milk product may be mixed with seasonings such as salt and pepper, additives such as antioxidants (e.g. sodium ascotbate), honey or other flavorings such as smoke flavor or roast flavour.

In some embodiments, said liquid fermented milk product may comprise up to 10% by weight of a pre-biotic additive such as a non-digestible carbohydrate. An example of a pre-biotic carbohydrate is inulin. The fermented milk product may comprise 1–10% wt inulin, which selectively promotes the activity of some health promoting bacteria in the colon.

Said fermented milk product may be injected into the meat piece using a single needle injector or a multi-needle injector. A suitable multi-needle injector is the injector that is commercially available from Schröder Maschinenbou GmbH under the trade name "Pökelinjektor N120". The fermented milk product may be injected at a pressure of about 0.9 to 3.0 bar depending on the type of meat and injection rate. The meat may be injected more than once. In some embodiments, the meat may be injected using tenderising needles.

After injection and mechanical processing, the product may be directly packaged if it is to be sold raw. Alternatively, the product may be coated with spices and/or marinades and optionally cut prior to packaging As a further alternative, the product may be cooked and optionally smoked and then packaged As with the raw product, the meat may be further divided into portions or slices prior to packaging as required. In some embodiments, the product may be shaped into any desired shape. For instance, the meat, after injection and tumbling, may be extruded to form an elongate log of generally circular or oval cross section using apparatus of the kind described in EP-A-024790 or EP-A-0850566.

The meat piece may comprise meat from any kind of slaughtered animal. For instance, the meat may comprise red meat, such, for example, as beef, venison, lamb or pork, or poultry, such, for example, as turkey or chicken.

BRIEF DESCRIPTION OF THE DRAWINGS

Following is a description by way of example only with reference to tile accompanying drawings of methods of carrying the present invention into effect.

In the drawings:

FIG. 2b is a schematic isometric view of a slice of the meat product of example 2a.

FIG. 3b is a schematic isometric view of a slice of the product of example 3a.

EXAMPLES

Example 1

Figure 1:
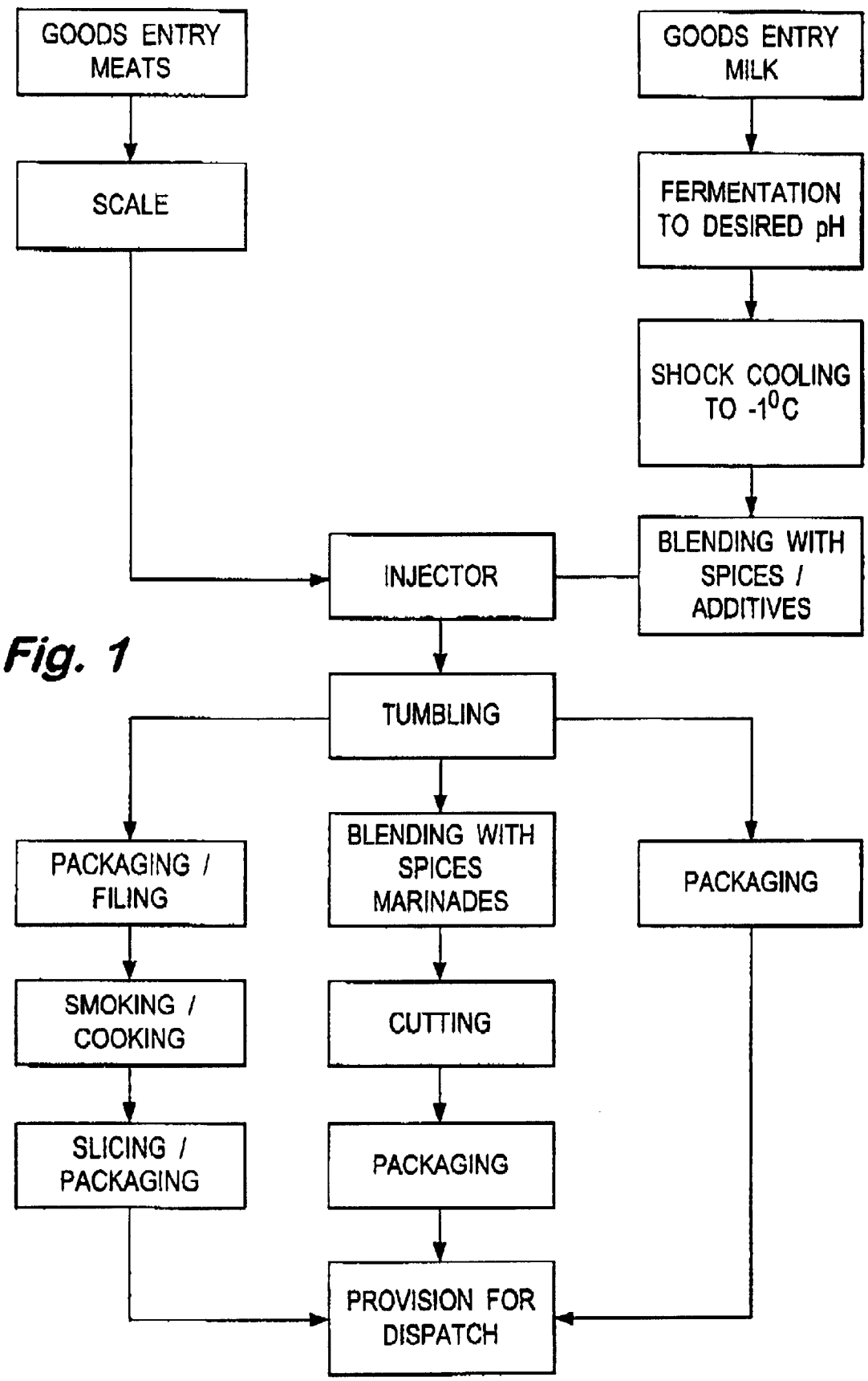
FIG. 1 is a flow diagram of a process in accordance with the present invention.
Figure 2A:
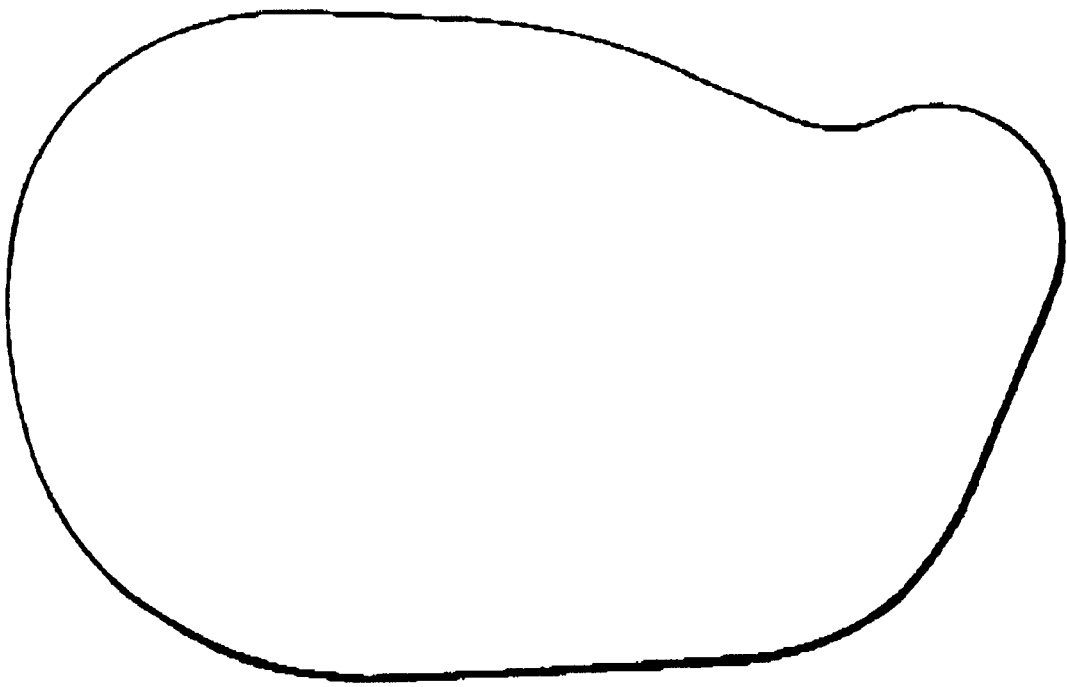
FIG. 2a is a schematic plan view of a meat product in accordance with the present invention.
Figure 2B:
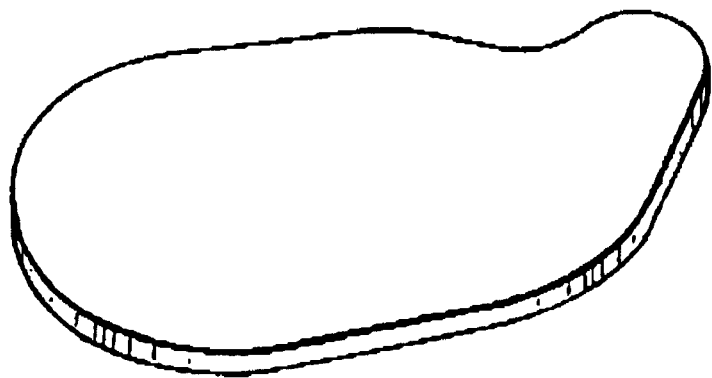
Figure 3A:
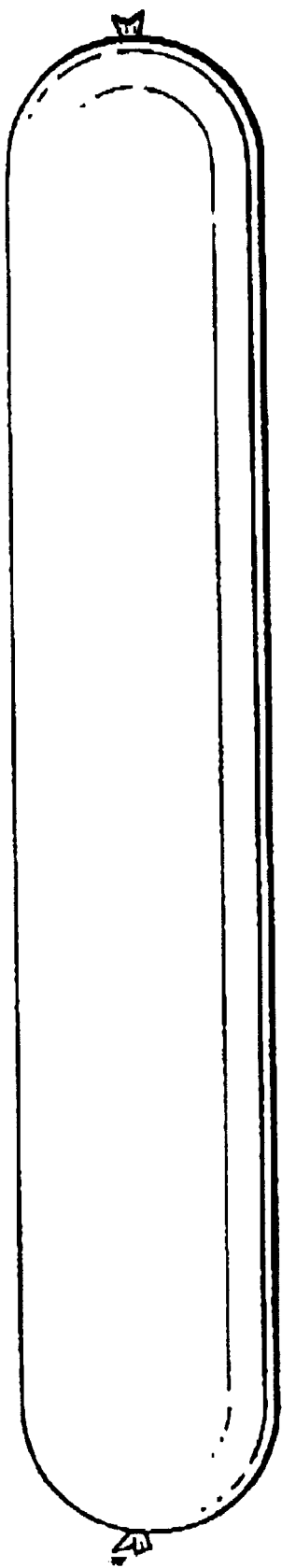
FIG. 3a is a schematic side view of a different product in accordance with the present invention.
Figure 3B:
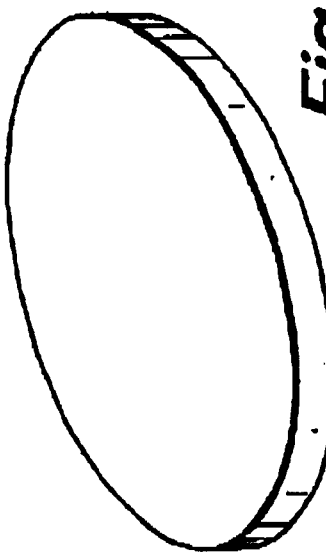

With reference to example 1, yogurt is manufactured substantially according to the traditional manner using milk that is clarified and separated into cream and skimmed milk and then standardised to achieve a desired fat content. The desired proportions of cream and skimmed milk are then blended together, and the mixture is pasteurized and homogenised. The homogenised mixture is heated to a temperature in the range 85 to 90° C. for about 30 minutes, and is then cooled to a temperature in the range about 30 to 50° C. After cooling the mixture is inoculated with yogurt starter cultures. The mixture is allowed to ferment for about 4 to 6 hours at 30–50° C., typically about 43° C., such that the mixture coagulates to form yogurt. The pH of the mixture is carefully monitored until a desired pH is reached. For products that are intended to be supplied raw to a consumer, the yogurt may be fermented until it is fully fermented in the range 3.6 to 5.1, preferably about 3.8 to 3.9. Alternatively, for meat products intended to be cooked as part of the manufacturing process and then supplied to a consumer for reheating, yogurt may be fermented to a relatively higher pH in the range of 4.8 to 5.1 using a slow working starter culture comprising *S.thermophilus, L.acidophilus* and Bifidobacteria.

Once the desired yogurt pH has been reached, the yogurt is subjected to shock freezing to a temperature of −1° C. to prevent further fermentation of the yogurt. For such shock freezing, liquid nitrogen or a plate-heat exchanger may be used. As an alternative the yogurt could be heated using a heat exchanger to a temperature in the range 65 to 70° C. This is especially convenient for yogurt having a low pH for injection into meat that is to be sold raw.

If desired, the fermented yogurt may then be blended with additional spices or other additives.

Contemporaneously, raw meat is provided in the form of monolithic pieces. Said pieces may be whole muscle or reformed pieces or alternatively said meat may be divided to form smaller pieces such as cubes or strips. The meat is weighed into portions of a predetermined weight, and is then combined with the yogurt using a multi needle injector, such as the "Pökelinjektor N120" available from Schröder Maschinenbau GmbH. The yogurt, with optional additives, is injected into the meat at a pressure of about 0.9 to 3.0 bar depending on the type of meat and the size of the needles. After injection of a predetermined amount of yogurt, the product is tumbled to distribute the yogurt substantially uniformly throughout the monolithic meat piece.

The product can then be packaged for dispatched. Alternatively, it may be blended with spices and/or other marinades and packaged. Optionally, the pieces may be further mechanically divided, for example, by being formed into slices.

In yet another alternative, the meat pieces after tumbling may be packaged and/or stuffed and then cooked and/or smoked prior to packaging. Again, the product may be divided further prior to packaging for dispatch.

Example 2

A pork steak with yogurt product is prepared according to the method of example 1 above using the following recipe:

Pork Steak with Yogurt

| | |
|---|---|
| Boneless Pork Loin | 73 kg |
| Yogurt Mix for Injection | |
| Yogurt | 25 kg |
| Salt | 1,7 kg |
| Pepper | 0,18 kg |
| Roast flavour | 0,12 kg |
| Total | 100 kg |

25 kg yogurt is combined with salt, pepper and a proprietary roast flavour. The yogurt mixture is then injected into 73 kg of boneless pork loin and tumbled. The resultant product is shown schematically in example 2a, and a slice through the product having approximately the weight of an individual portion is shown in example 2b.

Example 3

A turkey breast with yogurt and honey product is made following the above procedure of example 1, with the following recipe;

Turkey Breast with Yogurt and Honey

| | |
|---|---|
| Turkey breast | 70 kg |
| Yogurt Mix for Injection: | |
| Yogurt | 24 kg |
| Curing salt | 2 kg |
| Sodium ascorbate | 0,3 kg |
| Honey | 3,5 kg |
| Smoke flavour | 0,2 kg |
| Total | 100 kg |

24 kg of yogurt is mixed with curing salt, sodium ascorbate, honey and a proprietary smoke flavour. The yogurt mix is then injected into whole muscle turkey beast portions having a weight of 70 kg. The product is then tumbled aid extruded through a stuffing horn into a shirred casing. The resulting product is shown schematically in example 3a.

The extruded product is then cooked and smoked as follows:

Cooking and Smoking Procedure for Turkey Breast with Yogurt and Honey

| Step | Time | Process | Temp |
|---|---|---|---|
| 1 | 30 min | cooking | 45° C. |
| 2 | 30 min | cooking | 55° C. |
| 3 | 10 min | cooking | 60° C. |

-continued

| Step | Time | Process | Temp | |
|---|---|---|---|---|
| 4 | 10 min | cooking | 65° C. | |
| 6 | | cooking | 75° C. | to a core temperature of 72° C. |
| 7 | Cold water shower for 60 minutes | | | |
| 8 | 30 min | drying | 50° C. | |
| 9 | 30 min | smoking | 50° C. | |
| 10 | Cooling in chiller for 12 hours | | | |

After cooking and smoking, the casing is stripped from the product which is then sliced as shown in example 3b and repackaged for dispatch.

Example 4

A turkey breast steak with buttermilk product is made according to the following recipe:

| | |
|---|---|
| Turkey breast | 75.0 kg |
| Buttermilk mix for injection | |
| Buttermilk (pH 3.8–3.9) | 20.0 kg |
| Low fat yogurt (pH approx 4.0) | 3.0 kg |
| Salt | 1.7 kg |
| Pepper | 0.2 kg |
| Flavouring | 0.1 kg |
| | 100.0 kg |

The buttermilk is prepared in the known manner from the residual milk that remains after butter churning. Said residual milk is soured using *Latococcus lactis* subsp. *cremoris, Lactococcus lactis* subsp. *lactis, Leuconostoc mesenteroides* subsp. *cremoris* and/or *Lactococcus lactis* subsp. *diacetylactis* as starter cultures until a pH of 3.8–3.9 is reached. Said buternilk is then mixed with the yogurt, salt, pepper and other flavorings and injected into the turkey breaststeak as described in example 1 above. The injected turkey breaststeak is then tumbled, sliced into individual steaks and packaged.

Example 5

A pork steak with fermented whey product is made according to the following recipe:

| | |
|---|---|
| Boneless pork neck | 80 kg |
| Whey-brine for injection | |
| Fermented whey | 16.1 kg |
| Salt | 1.6 kg |
| Flavourings | 0.3 kg |
| Whey powder | 2.0 kg |
| | 100.0 kg |

The whey brine is obtained as a by-product of fresh cheese manufacture in which whole milk is fermented using *Lactococcus lactis* subsp. *cremoris, Lactococcus lactis* subsp. *lactis* and/or *Leuconostoc mesenteroides* subsp. *cremoris* as cheese starter cultures in the presence of a curdling enzyme such as rennet. Once a pH of 3.8 or less is reached, the fermentation is quenched and the cheese allowed to set. Thereafter the cheese is crushed mechanically and the liquid whey extracted from the cheese solids. The sour whey is then mixed with the whey powder, salt and other flavorings and injected into the pork neck as described in example 1. The pork necks are then tumbled, sliced into individual steaks and packaged.

Example 6

A sliceball cooked meat product in manufactured according to the following recipe:
Chicken breast with Buttermilk and Tarragon

| | |
|---|---|
| Chicken breast | 70.0 kg |
| Buttermilk - brine for injection | |
| Buttermilk | 25.0 kg |
| Curing salt | 2.0 kg |
| Sodium ascorbate | 0.3 kg |
| Sugarmix | 2,0 kg |
| Spices | 0.5 kg |
| Tarragon flavour | 0.2 kg |
| | 100.0 kg |

Buttermilk is produced and soured as disclosed in example 4 above to a mild pH of 5.2 or more, using slow working souring cultures. Said buttermilk is mixed with the curing salt, sodium ascorbate, sugarmix, spices and tarragon flavour, and then injected into the chicken brat as described in example 1 above. Said chicken breast is then tumbled, extruded into a flexible shirred casing, steam-cooked and chilled. After cooling, the casing is stripped-off and the product is sliced as 'cold cut'sliced meat product and packaged.

What is claimed is:

1. A meat product comprising a monolithic piece of meat, wherein said piece has been injected with a liquid fermented milk product and then processed mechanically to distribute said fermented milk product substantially uniformly throughout the piece.

2. A meat product as claimed in claim 1, comprising 5 to 50% by weight of injected, fermented milk product.

3. A meat product as claimed in claim 1 which is raw.

4. A meat product as claimed in claim 3, wherein said fermented milk product has a pH of less than 5.2.

5. A meat product as claimed in claim 3, wherein said fermented milk product has a pH of 3.8 to 3.9.

6. A meat product as claimed in claim 3, wherein said fermented milk product has a pH of less than 4.0.

7. A meat product as claimed in claim 1, wherein said product is cooked.

8. A meat product as claimed in claim 7, wherein said product has a pH of not less than 5.0.

9. A meat product as claimed in claim 7, wherein said product has a pH of at least 5.5.

10. A meat product as claimed in claim 1, wherein said fermented milk product is selected from one or more of yogurt, buttermilk, soured cream milk, soured milk, fermented whey and kefir.

11. A meat product as claimed in claim 1, wherein said fermented milk product comprises 5 to 25% by weight of additional flavorings and/or condiments.

12. A meat product as claimed in claim 1, wherein said fermented milk product comprises up to 10% by weight of pre-biotic additive.

13. A meat product comprising a monolithic piece of meat, wherein said piece has been injected with yogurt and then processed mechanically to distribute said yogurt substantially uniformly throughout the piece.

14. A meat product as claimed in claim 13, comprising 5 to 50% by weight of injected yogurt.

15. A meat product as claimed in claim 13 which is raw.

16. A meat product as claimed in claim 15, wherein said yogurt has a pH of less than 5.2.

17. A meat product as claimed in claim 15, wherein said yogurt has a pH of 3.8 to 3.9.

18. A meat product as claimed in claim 15, wherein said yogurt has a pH of less than 4.0.

19. A meat product as claimed in claim 13, wherein said product is cooked.

20. A meat product as claimed in claim 19, wherein said product has a pH of not less than 5.0.

21. A meat product as claimed in claim 19, wherein said product has a pH of at least 5.5.

22. A meat product as claimed in claim 13, wherein said yogurt comprises 5 to 25% by weight of additional flavorings and/or condiments.

23. A meat product as claimed in claim 13, wherein said yogurt comprises up to 10% by weight of pre-biotic additive.

24. A raw meat product comprising a monolithic piece of meat, wherein said piece has been injected with a liquid fermented milk product having a pH of less than 5.2, and then processed mechanically to distribute said fermented milk product substantially uniformly throughout the piece.

25. A raw meat product as claimed in claim 24, wherein said fermented milk product has a pH of 3.8 to 3.9.

26. A raw meat product as claimed in claim 24, wherein said fermented milk product has a pH of less than 4.0.

27. A cooked meat product comprising a monolithic piece of meat, wherein said piece has been injected with a liquid fermented milk product and then processed mechanically to distribute said fermented milk product substantially uniformly throughout the piece, said product having a pH of not less than 5.0.

28. A cooked meat product as claimed in claim 27, wherein said product has a pH of at least 5.5.

29. A meat product comprising:

a monolithic piece of meat; and a liquid fermented milk product injected into said monolithic piece of meat;

said monolithic piece of meat having a structure disrupted by mechanical processing; and said liquid fermented milk product being distributed substantially uniformly throughout said monolithic piece of meat.

30. A meat product as claimed in claim 29, wherein said meat product is raw and said fermented milk product has a pH of less than 5.2.

31. A meat product as claimed in claim 29, wherein said meat product is cooked and has a pH of not less than 5.0.

32. A meat product as claimed in claim 29, comprising 5 to 50% by weight of injected, fermented milk product.

\* \* \* \* \*